United States Patent
Chen

(10) Patent No.: US 8,651,043 B2
(45) Date of Patent: Feb. 18, 2014

(54) ALARM MARK STRUCTURE OF A MICRO-DIFFERENTIAL PRESSURE GAUGE

(75) Inventor: Li-Chen Chen, Bade (TW)

(73) Assignee: Hwa Chi Technology Co., Ltd., Taoyuan County (TW)

( * ) Notice: Subject to any disclaimer, the term of this patent is extended or adjusted under 35 U.S.C. 154(b) by 359 days.

(21) Appl. No.: 13/105,223

(22) Filed: May 11, 2011

(65) Prior Publication Data

US 2011/0283932 A1    Nov. 24, 2011

(30) Foreign Application Priority Data

May 20, 2010  (TW) ............................ 99209463 U

(51) Int. Cl.
*G01D 13/24* (2006.01)
*G01L 19/12* (2006.01)

(52) U.S. Cl.
USPC ................ 116/296; 116/328; 116/DIG. 23; 73/866.3

(58) Field of Classification Search
USPC ......... 116/271, 290, 291, 292, 293, 296, 298, 116/300, 301, 304, 305, 316, 319, 320, 321, 116/323, 324, 326, 327, 328, 329, DIG. 6, 116/DIG. 21, DIG. 23, DIG. 46; 73/431, 700, 73/866.3
See application file for complete search history.

(56) References Cited

U.S. PATENT DOCUMENTS

| 140,867 | A | * | 7/1873 | Annin | 116/334 |
| 1,723,390 | A | * | 8/1929 | Tingley | 116/316 |
| 2,829,620 | A | * | 4/1958 | Wilson | 116/296 |
| 4,513,604 | A | * | 4/1985 | Frantz et al. | 73/39 |
| 4,878,453 | A | * | 11/1989 | Inoue et al. | 116/288 |
| 5,679,903 | A | * | 10/1997 | Mock | 73/740 |
| 5,765,501 | A | * | 6/1998 | Tung et al. | 116/323 |
| 8,508,365 | B2 | * | 8/2013 | Chen | 340/540 |
| 2001/0039914 | A1 | * | 11/2001 | Chester | 116/328 |
| 2006/0107747 | A1 | * | 5/2006 | Huang | 73/732 |

FOREIGN PATENT DOCUMENTS

| CN | 202403718 U | * | 8/2012 | G01D 13/00 |
| CN | 202403719 U | * | 8/2012 | G01D 13/00 |
| EP | 1215478 A2 | * | 6/2002 | G01L 19/10 |
| JP | 07049248 A | * | 2/1995 | G01D 13/22 |
| JP | 10274550 A | * | 10/1998 | G01D 13/22 |
| JP | 11016079 A | * | 1/1999 | G08C 15/00 |

* cited by examiner

*Primary Examiner* — R. A. Smith
(74) *Attorney, Agent, or Firm* — Chun-Ming Shih

(57) ABSTRACT

An alarm mark structure of a micro-differential pressure gauge includes a transparent casing. The transparent casing has at least one recess thereon. The recess is located corresponding to the range of movement of a pointer or a scale plate. At least one mark member is provided on the transparent casing. The mark member has an engaging portion. The engaging portion is inserted in the recess, such that the mark member is coupled on the transparent casing. The user can place the mark member on the recess corresponding to the numerical value on the scale plate as desired to know whether the pointer is located within a safe area.

4 Claims, 4 Drawing Sheets

ALARM MARK STRUCTURE OF A MICRO-DIFFERENTIAL PRESSURE GAUGE

BACKGROUND OF THE INVENTION

1. Field of the Invention

The present invention relates to an alarm mark structure of a micro-differential pressure gauge, and more particularly, to a pointer gauge structure having a mark member which is coupled to a recess of a transparent casing.

2. Description of the Prior Art

A conventional gauge, such as a micro-differential pressure gauge or a pressure gauge, includes a pointer therein. The pointer is rotated according to the pressure. In conjunction with a numeral scale plate in the gauge, the user can read the value. In general, the gauge is set with a security value. For the user to know whether or not the pointer is in the range of safety, the gauge is provided with a safety mark. The conventional mark is secured on an outer edge of the gauge. When the gauge has to be installed in an embedded way, such as in a hole of a flat board of an apparatus, the mark cannot be attached to the gauge because the circumferential edge of the gauge is tightly against the flat board. Accordingly, the inventor of the present invention has devoted himself based on his many years of practical experiences to solve this problem.

SUMMARY OF THE INVENTION

The primary object of the present invention is to provide an alarm mark structure of a micro-differential pressure gauge. A mark member is disposed on a transparent casing, which doesn't exceed the circumference of the gauge, such that the mark member can be easily coupled to the gauge which is installed in an embedded way.

In order to achieve the aforesaid object, an alarm mark structure of a micro-differential pressure gauge includes a transparent casing. The transparent casing has at least one recess thereon. The recess is located corresponding to the range of movement of a pointer or a scale plate. At least one mark member is provided on the transparent casing. The mark member has an engaging portion. The engaging portion is inserted in the recess, such that the mark member is coupled on the transparent casing. The user can place the mark member on the recess corresponding to the numerical value on the scale plate as desired to know whether the pointer is located within a safe area.

Preferably, the recess is a concave hole on the transparent casing, not a through hole.

Preferably, the recess and the engaging portion are tightly engaged.

Preferably, the mark member has a pointed end for the user to see the pointer easily.

Preferably, the mark member is colored such as red, to provide an alarm effect.

DETAILED DESCRIPTION OF THE PREFERRED EMBODIMENTS

Embodiments of the present invention will now be described, by way of example only, with reference to the accompanying drawings.

Figure 1:
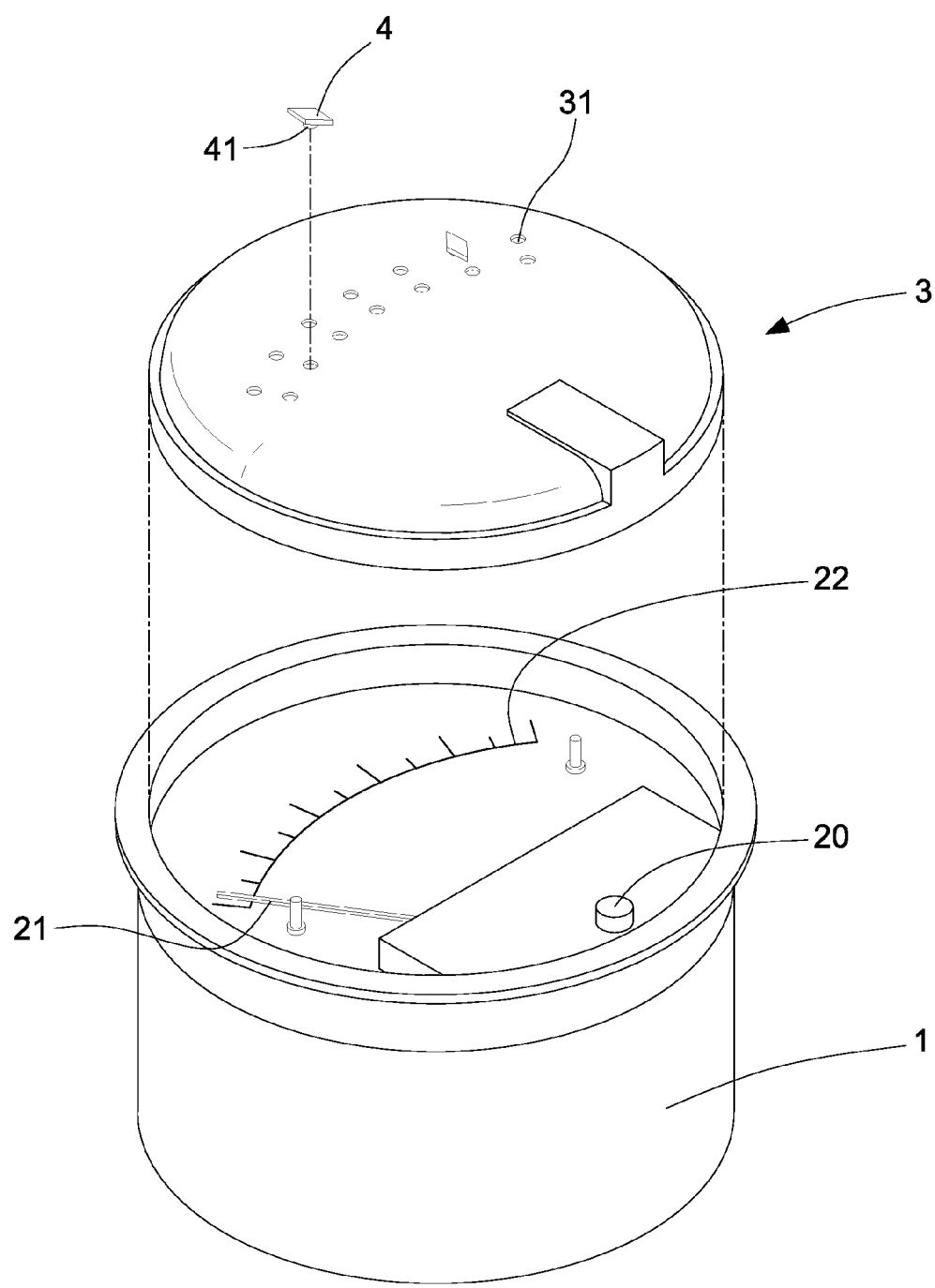
FIG. 1 is an exploded view according to a preferred embodiment of the present invention.
Figure 2:
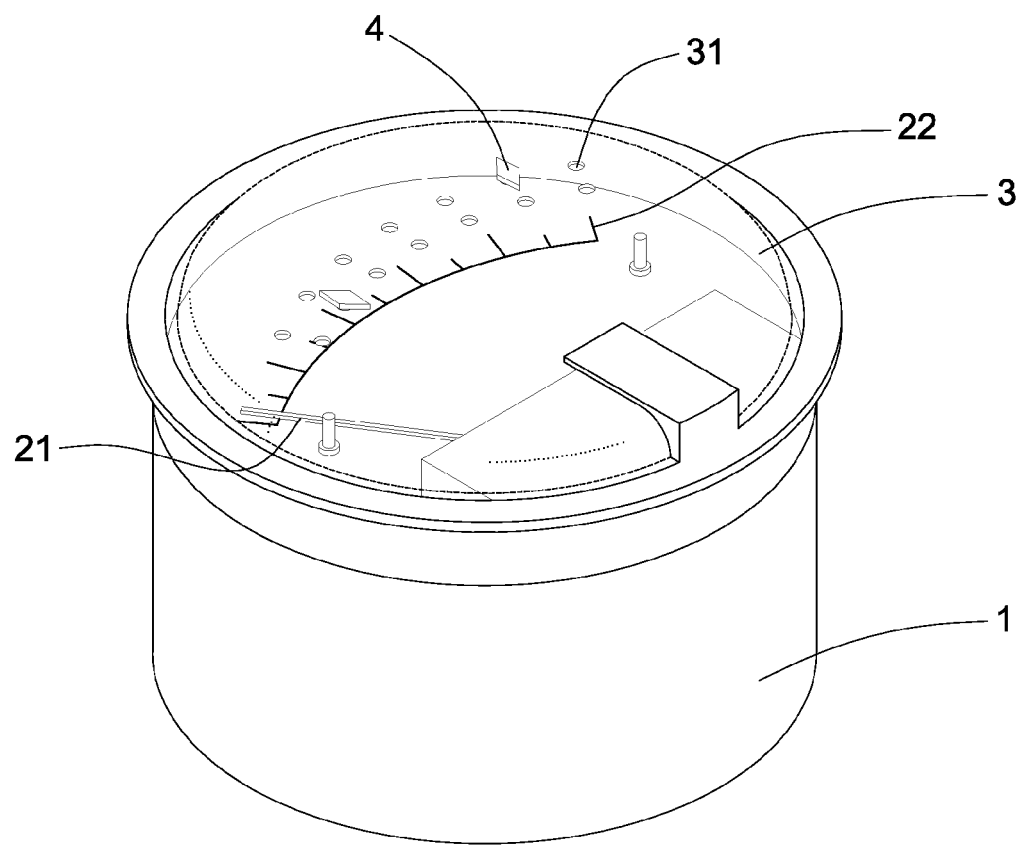
FIG. 2 is a perspective view according to the preferred embodiment of the present invention.

As shown in FIG. 1 and FIG. 2, an alarm mark structure of a micro-differential pressure gauge according to a preferred embodiment of the present invention comprises a gauge base 1, a transparent casing 3, and a mark member 4.

The gauge base 1 is incorporated with other parts to become a pointer gauge which may be a pressure gauge or a micro-differential pressure gauge. The gauge base 1 comprises a pointer 21, an axle 20 and a scale plate 22 therein. The pointer 21 can be moved through the axle 20 in accordance with the inside pressure to display the numerical value on the scale plate 22.

The transparent casing 3 is coupled on the gauge base 1. The transparent casing 3 has at least one recess 31 thereon. The recess 31 is located corresponding to the range of movement of the pointer 21 or the scale plate 22. The recess 31 is a concave hole on the transparent casing 3, not a through hole. The mark member 4 has an engaging portion 41. The engaging portion 41 is inserted in the recess 31, such that the mark member 4 is coupled to the transparent housing 3.

The recess 31 and the engaging portion 41 are tightly engaged.

Preferably, the mark member 4 has a pointed end. The mark member 4 is colored, such as red, to provide an alarm effect.

Figure 3:
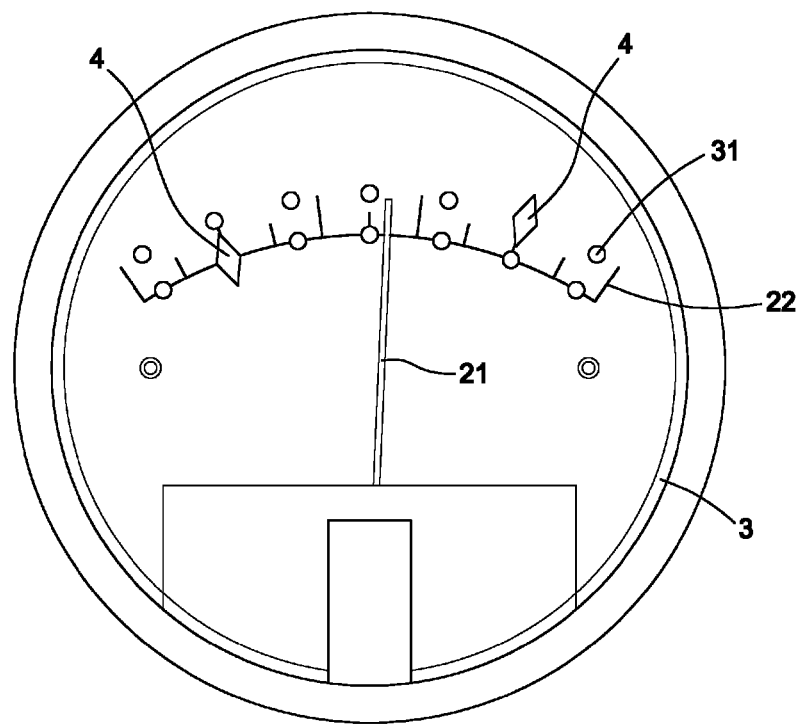
FIG. 3 is a top view according to the preferred embodiment of the present invention.

When in use, as shown in FIG. 3, two mark members 4 are engaged in the desired recesses 31 to indicate a safe area and an alarm threshold value. If the pointer 21 passes any mark member 4, the observer will know easily and handle the crisis immediately.

Figure 4:
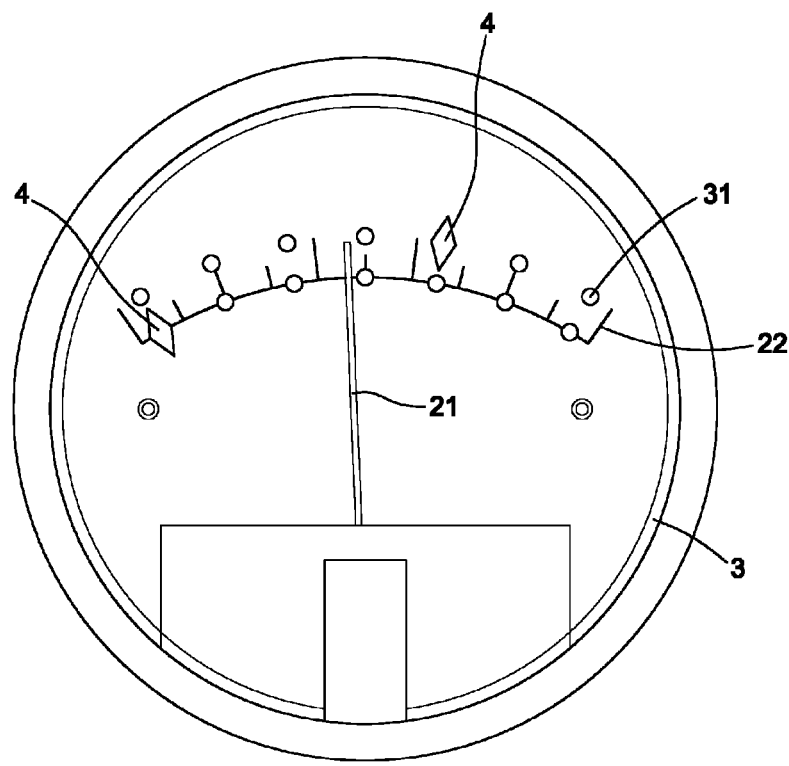
FIG. 4 is another top view according to the preferred embodiment of the present invention to show that the position of the mark member is changed.

Referring to FIG. 4, the transparent casing 3 has a plurality of recesses 31. The user can change the position of the mark member 4, so that the alarm value is changed as desired.

The mark member 4 is disposed within the gauge surface. Even if the gauge is installed in an embedded way, the mark member 4 of the present invention is disposed externally and can be seen with ease.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An alarm mark structure of a micro-differential pressure gauge, comprising:
   a gauge base comprising a pointer, an axle and a scale plate therein, the pointer moving through the axle to display a numerical value on the scale plate;
   a transparent casing coupled on the gauge base, the transparent casing having at least one recess, which is not a through hole, thereon, the recess being located corresponding to the range of movement of the pointer; and
   at least one mark member, the mark member having an engaging portion, the engaging portion being inserted in the recess.

2. The alarm mark structure of a micro-differential pressure gauge as claimed in claim 1, wherein the recess and the engaging portion are tightly engaged.

3. The alarm mark structure of a micro-differential pressure gauge as claimed in claim 1, wherein the mark member has a pointed end.

4. The alarm mark structure of a micro-differential pressure gauge as claimed in claim 1, wherein the mark member is colored.

\* \* \* \* \*